(12) United States Patent
Bentley

(10) Patent No.: US 9,813,763 B2
(45) Date of Patent: Nov. 7, 2017

(54) APPLICATION FOR IN-FIELD DISCOVERY, DIAGNOSIS AND REPAIR OF A SET-TOP DEVICE

(71) Applicant: Time Warner Cable Enterprises LLC, New York, NY (US)

(72) Inventor: James Bentley, Colorado Springs, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/722,146

(22) Filed: May 26, 2015

(65) Prior Publication Data

US 2016/0353163 A1 Dec. 1, 2016

(51) Int. Cl.
*H04N 21/442* (2011.01)
*H04N 21/6543* (2011.01)
*H04N 21/658* (2011.01)
*H04N 17/00* (2006.01)

(52) U.S. Cl.
CPC ......... *H04N 21/442* (2013.01); *H04N 17/004* (2013.01); *H04N 21/44231* (2013.01); *H04N 21/6543* (2013.01); *H04N 21/6582* (2013.01)

(58) Field of Classification Search
CPC ... H04L 41/5074; H04L 41/509; H04L 69/40; H04N 17/004; H04N 21/4425; H04N 21/442
See application file for complete search history.

(56) References Cited

U.S. PATENT DOCUMENTS

| | | | |
|---|---|---|---|
| 7,792,963 B2 | 9/2010 | Gould | |
| 2006/0130107 A1 | 6/2006 | Gonder | |
| 2007/0217436 A1* | 9/2007 | Markley | H04N 21/4367 370/401 |
| 2009/0210912 A1* | 8/2009 | Cholas | H04N 21/43615 725/82 |
| 2009/0248794 A1 | 10/2009 | Helms | |
| 2010/0027412 A1* | 2/2010 | Yang | H04L 41/5067 370/216 |
| 2010/0313236 A1 | 12/2010 | Straub | |
| 2014/0129613 A1* | 5/2014 | Van Depoel | H04L 67/125 709/202 |

* cited by examiner

*Primary Examiner* — Hai V Tran

(74) *Attorney, Agent, or Firm* — Otterstedt, Ellenbogen & Kammer, LLP

(57) ABSTRACT

A method for performing in-field discovery, diagnosis and/or repair of a set-top device includes the steps of: determining whether at least a first set-top device is non-responsive to a head-end via a communication channel established between the head-end and the first set-top device; executing a search and rescue (SAR) module on the first set-top device when it is determined that the first set-top device is non-responsive to the head-end; and re-establishing communications between the first set-top device and the head-end by the SAR module executing on the first set-top device.

25 Claims, 14 Drawing Sheets

APPLICATION FOR IN-FIELD DISCOVERY, DIAGNOSIS AND REPAIR OF A SET-TOP DEVICE

FIELD OF THE INVENTION

The present invention relates generally to content networks and other communications networks, and, more particularly, to set-top boxes.

BACKGROUND OF THE INVENTION

In a broadcast media environment, a set-top box (STB) is a well-known electronic device that is connected to a communication channel, such as a cable television network, and produces an output on a conventional television screen or other display device. STBs are often used in cable television, satellite television and over-the-air television systems to receive and decode digital television (DTV) broadcasts and to interface with the Internet, or other communication network, through a user's television instead of a personal computer or other computing device.

The functions and capabilities of an STB can vary widely, depending upon the complexity of the STB. For example, STBs can range from the simplest, which merely receive and unscramble incoming television signals, to the more complex, which also function essentially as multimedia desktop computers that can run a variety of advanced services such as video-on-demand (VOD), Internet Protocol (IP) telephony, home networking, and high-speed IP television (IPTV) services.

The STB typically communicates with a head-end of a multi-service operator (MSO) via a radio frequency (RF) network. On occasion, the STB may become inaccessible or otherwise non-responsive through the RF network. If the STB is not accessible, either due to firewall rules or web server or other communication errors, there is essentially no way to determine the source of the communication error from the head-end. Thus, a disruptive reboot of the STB would be required, or a repair technician would need to be deployed into the field in order to diagnosis and repair the STB, which is costly.

SUMMARY OF THE INVENTION

Principles of the present invention provide a mechanism for the discovery, diagnosis and repair of a set-top device that is inaccessible to the head-end through a communication channel otherwise established between the head-end and the set-top device. More particularly, one or more embodiments provide a standalone search and rescue (SAR) application that can be delivered to a set-top device in a connected home network. The SAR application is deployed to a distressed set-top device—one that has limited or no connectivity—from which diagnosis and repairs can be made.

In one aspect, an exemplary method for performing in-field discovery, diagnosis and/or repair of a set-top device includes the steps of: determining whether at least a first set-top device is non-responsive to a head-end via a communication channel established between the head-end and the first set-top device; executing a search and rescue (SAR) module on the first set-top device when it is determined that the first set-top device is non-responsive to the head-end; and re-establishing communications between the first set-top device and the head-end by the SAR module executing on the first set-top device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., set top box and/or server) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:

- a standalone search and rescue application that can be delivered to a set-top device in a connected home network;
- an application used to recover data, including log files and/or diagnostic information, from a set-top device that is no longer responding to a head-end on the RF network;
- re-establishing communications between a set-top device and the head-end, without the need for re-booting the device or requiring an in-home service call;
- remotely administering settings to a non-responsive set-top via a proxying set-top device;
- verifying an operating state of a non-responsive set-top device; and
- reducing or eliminating on-site maintenance operations.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Purely by way of example only and without limitation, embodiments of the invention will be shown in the context of a cable multi-service operator (MSO) providing data and voice services as well as entertainment services. However, one or more embodiments are broadly applicable to any broadband network, non-limiting examples of which include an Internet Protocol (IP) network, fiber-to-the-curb (FTTC) or fiber-to-the-premises (FTTP) network, wireless broadband, and the like. Specifically, one or more embodiments of the invention are directed to a mechanism for performing in-field discovery, diagnosis and/or repair of a set-top device (e.g., cable set-top box (STB)) that has become inaccessible to a head-end through a communication channel otherwise established between the head-end and set-top device.

It should be understood that embodiments of the invention are not limited to the system, methods and/or apparatus shown and described herein. Rather, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

As previously noted, digital television (DTV) broadcasts, IP-based data services (and, for that matter, Internet Protocol television (IPTV)) and the like, may be provided over a variety of networks through an STB residing at the customer premises. Purely by way of example and not limitation, some embodiments will be shown in the context of a cable multi-service operator (MSO) providing data services as well as entertainment services. In one or more embodiments, an STB periodically reports its status to the head-end. If this status is not received in the head-end in a timely manner, or otherwise when expected, servers in the head-end may determine that the STB is unresponsive. Servers in the head-end, or at another location in the communication network, can also periodically poll (i.e., attempt to communicate with) a particular STB. Failure to establish communications between the head-end and the STB can be an indication of an unresponsive STB.

Figure 1:
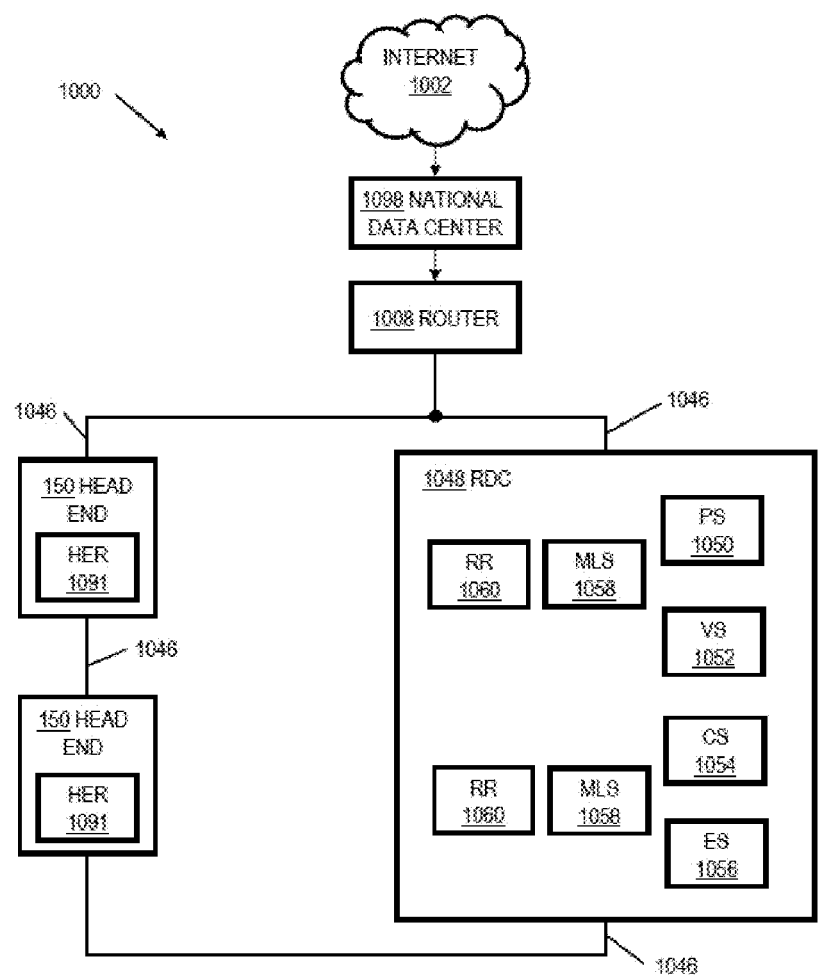
FIG. 1 is a block diagram of an exemplary embodiment of a system, within which one or more aspects of the invention can be implemented.

FIG. 1 is a block diagram depicting at least a portion of an exemplary system 1000, according to an aspect of the invention. System 1000 includes a regional data center (RDC) 1048, and one or more divisions, represented by division head-ends 150. The term head-end as used herein broadly refers to a facility or system which receives and distributes broadcast and/or data services to subscribers; the head-end typically gathers programming sources (e.g., television signals), decodes, selects and retransmits broadcast programming to a distribution network. The programming sources to the head-end may include, but are not limited to, satellite signals, off-air receivers, microwave connections and other broadcast (e.g., video) feed signals. In the context of a satellite network, a head-end 150 may be implemented as a back-office system or the like, although it is to be understood that the function of the head-end is equivalent, at least as it pertains to aspects of the invention, regardless of the network or system (e.g., cable system, satellite network, etc.) in which it is employed.

RDC 1048 and head-ends 150 are interconnected by a network 1046; by way of example and not limitation, a dense wavelength division multiplex (DWDM) network. Elements 1048 and 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head-ends 150 may each include a head-end router (HER) 1091 which interfaces with network 1046. Head-end routers 1091 are omitted from figures below merely for economy of description. This does not imply that head-end routers 1091 are not present in a commercial implementation of one or more embodiments of the invention.

RDC 1048 may include one or more provisioning servers (PS) 1050, one or more video servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head-ends and/or regional data centers. For example, such an NDC might include one or more VOD servers; switched digital video (SDV) functionality; gateways to obtain content (e.g., program content) from various sources including cable feeds and/or satellite; and so on.

Figure 2:
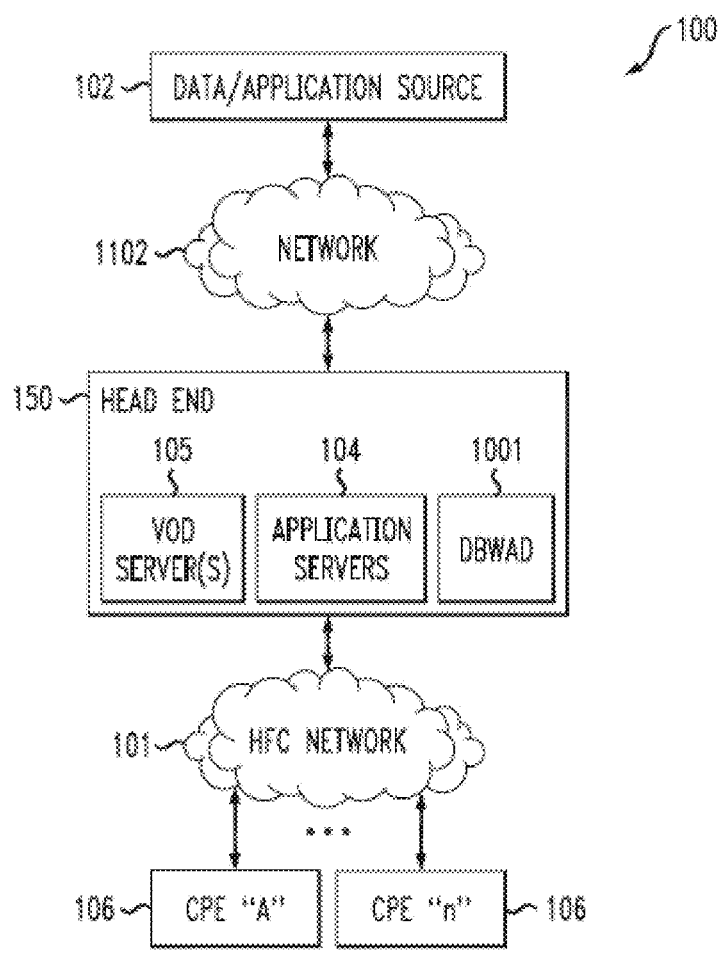
FIG. 2 is a functional block diagram illustrating an exemplary hybrid fiber-coaxial (HFC) divisional network configuration, useful within the system of FIG. 1.

FIG. 2 is a functional block diagram illustrating at least a portion of an exemplary content-based (e.g., hybrid fiber-coaxial (HFC)) divisional network 100, useful within the system of FIG. 1. See, for example, U.S. Patent Application Publication No. 2006/0130107 of Gonder et al., entitled "Method and Apparatus for High Bandwidth Data Transmission in Content-based Networks," the complete disclosure of which is expressly incorporated by reference herein in its entirety for all purposes. The various components of the network 100 include: (i) one or more data and application origination points 102; (ii) one or more application distribution servers 104; (iii) one or more VOD servers 105; and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head-end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive/Independent Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head-end 150, HFC network 101, and CPEs 106 thus represent the divisions which were represented by division head-ends 150 in FIG. 1.

The application distribution server 104 comprises a computer system where such applications can enter the network system. Distribution servers per se are well known in the networking arts, and accordingly will not be described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes (STBs), game consoles, IP video streaming boxes, Internet-connected TVs and high-speed cable modems for providing high bandwidth Internet access in premises such as homes and businesses.

Also included (for example, in head-end 150) is a dynamic bandwidth allocation device (DBWAD) 1001 such as a global session resource manager, which is itself a non-limiting example of a session resource manager.

Figure 3:
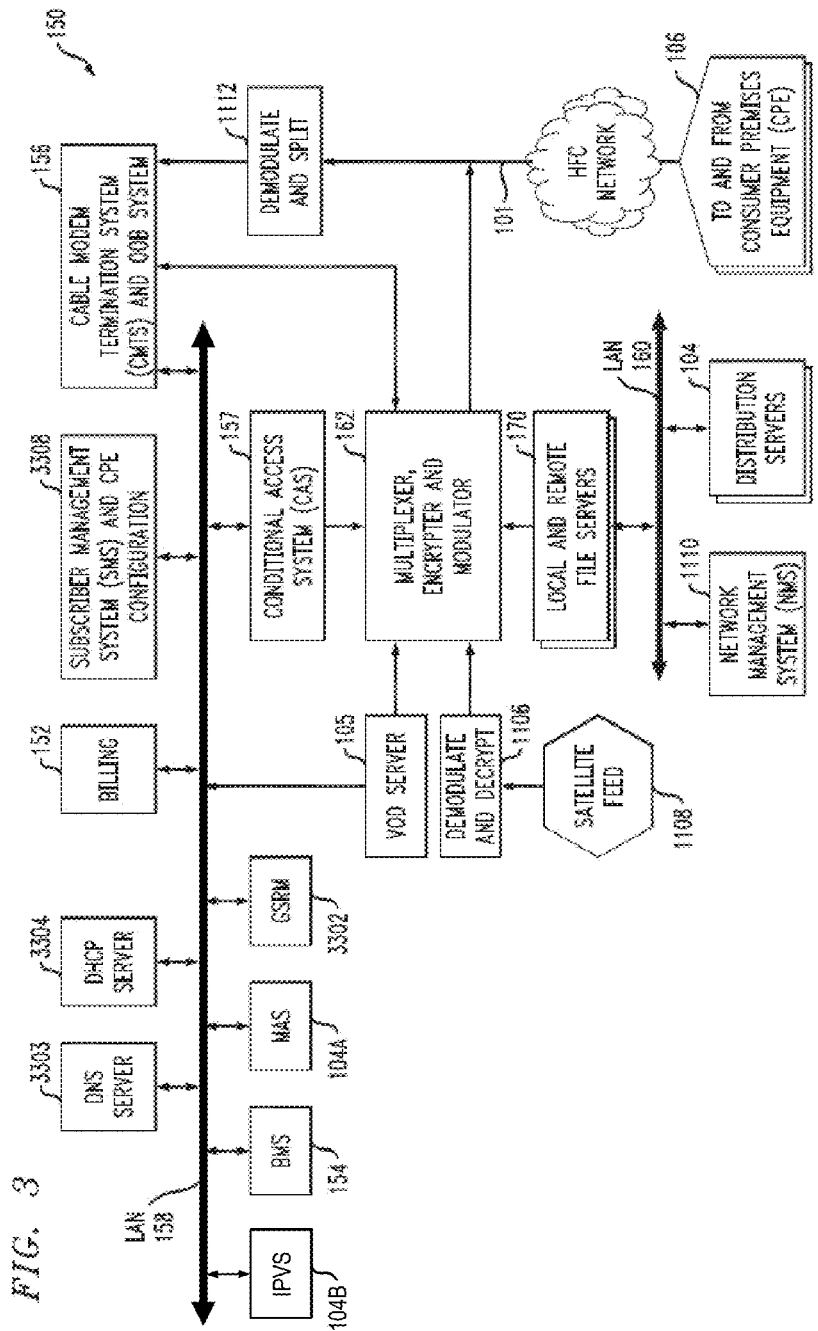
FIG. 3 is a functional block diagram illustrating one exemplary HFC cable network head-end configuration, useful within the system of FIG. 1.

FIG. 3 is a functional block diagram illustrating at least a portion of an exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled "Method to Block Unauthorized Network Traffic in a Cable Data Network," the complete disclosure of which is expressly incorporated herein by reference in its entirety for all purposes.

It will be appreciated that while a bar or bus LAN topology is illustrated, any number of other network arrangements (e.g., ring, star, etc.) may be used consistent with the invention. It will also be appreciated that the head-end configuration depicted in FIG. 3 is a high-level, conceptual architecture and that each MSO may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., traditional audio, traditional (as distinguished from IPTV) video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS channels and associated protocols (e.g., DOCSIS 1.x, 2.0. or 3.0). The OpenCable™ Application Platform (OCAP) 1.0, 2.0, 3.0 (and subsequent) specification (Cable Television Laboratories Inc.) provides for exemplary networking protocols both downstream and upstream, although the invention is in no way limited to these approaches. All versions of the DOCSIS and OCAP specifications are expressly incorporated herein by reference in their entireties for all purposes. One or more aspects of embodiments of the invention are implemented for IPTV video in, for example, TWC TV®, a registered trademark of Time Warner Inc., applications, although embodiments of the invention are not limited to this implementation.

Furthermore in this regard, DOCSIS is an international telecommunications standard that permits the addition of high-speed data transfer to an existing cable TV (CATV) system. It is employed by many cable television operators to provide Internet access (cable Internet) over their existing HFC infrastructure. Use of DOCSIS to transmit data (including IPTV) on an HFC system is one non-limiting exemplary context associated with one or more embodiments. However, one or more embodiments are generally applicable to IPTV, regardless of what kind of functionality is employed.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server (MAS) 104A, Internet Protocol Video Services (IPVS) 104B (an MAS equivalent for TWC TV® applications), and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more DHCP server(s) 3304 can also be located where shown or in different locations.

Figure 4:
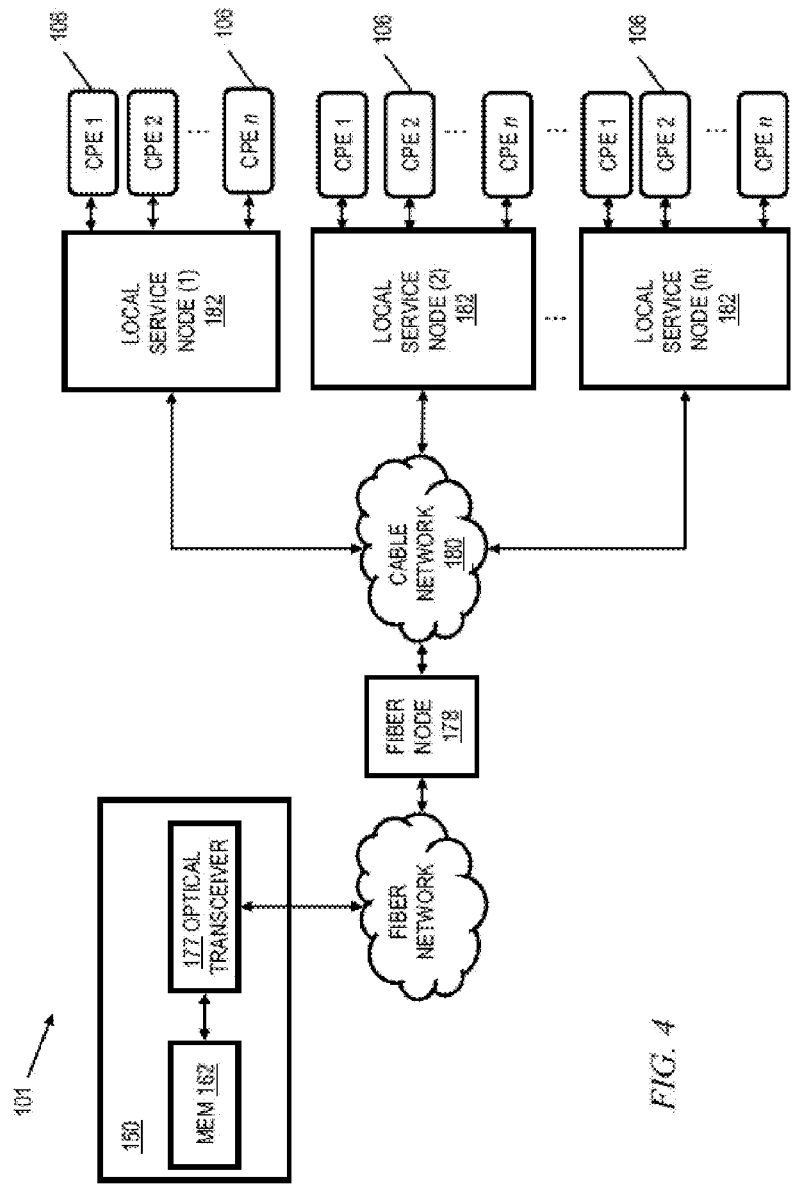
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication No. 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number of CPE 106 per node 182 may be different than the number of nodes 182.

US Patent Publication No. 2010/0313236 of Albert Straub, entitled "Techniques for Upgrading Software in a Video Content Network," the complete disclosure of which is expressly incorporated herein by reference for all purposes, provides additional details on the aforementioned dynamic bandwidth allocation device 1001.

US Patent Publication No. 2009/0248794 of William L. Helms, entitled "System and Method for Content Sharing," the complete disclosure of which is expressly incorporated herein by reference for all purposes, provides additional details on CPE in the form of a converged premises gateway device. Related aspects are also disclosed in US Patent Publication No. 2007/0217436 of Markley et al, entitled "Methods and Apparatus for Centralized Content and Data Delivery," the complete disclosure of which is expressly incorporated herein by reference for all purposes.

Figure 5:
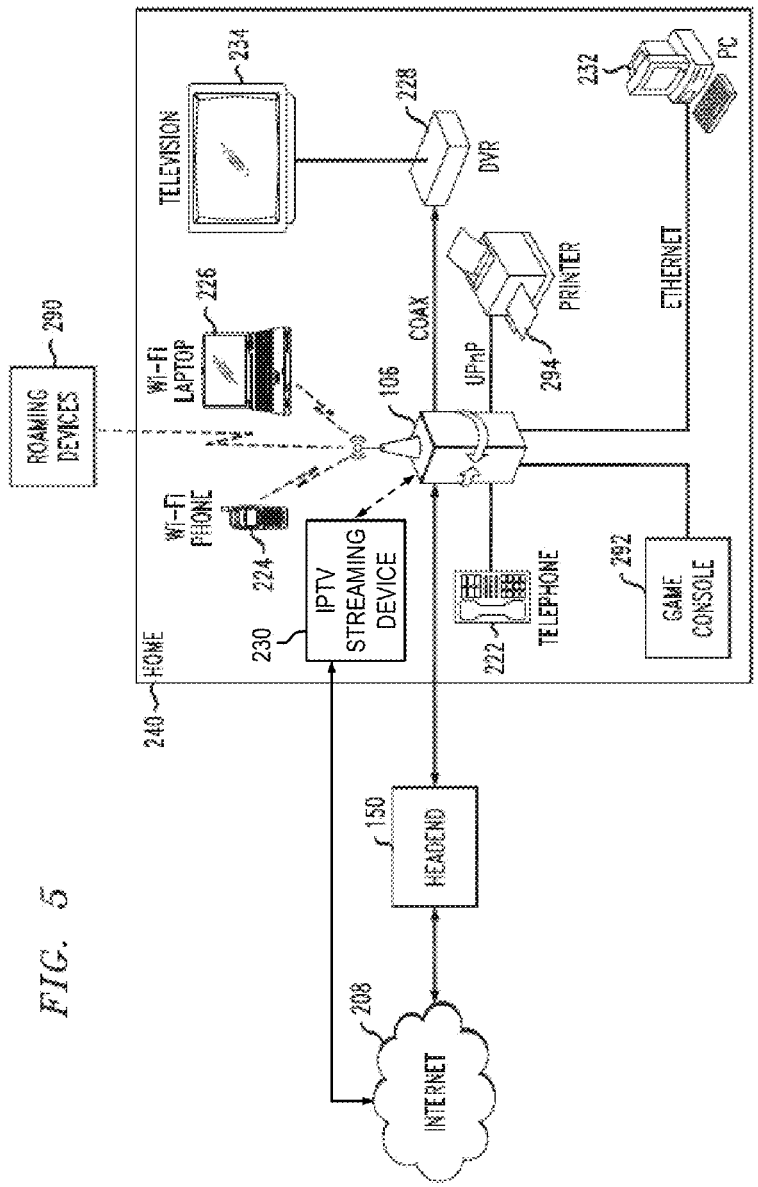
FIG. 5 is a functional block diagram of a premises network, including an exemplary centralized customer premises equipment (CPE) unit, interfacing with a head-end such as that of FIG. 3.
Figure 6:
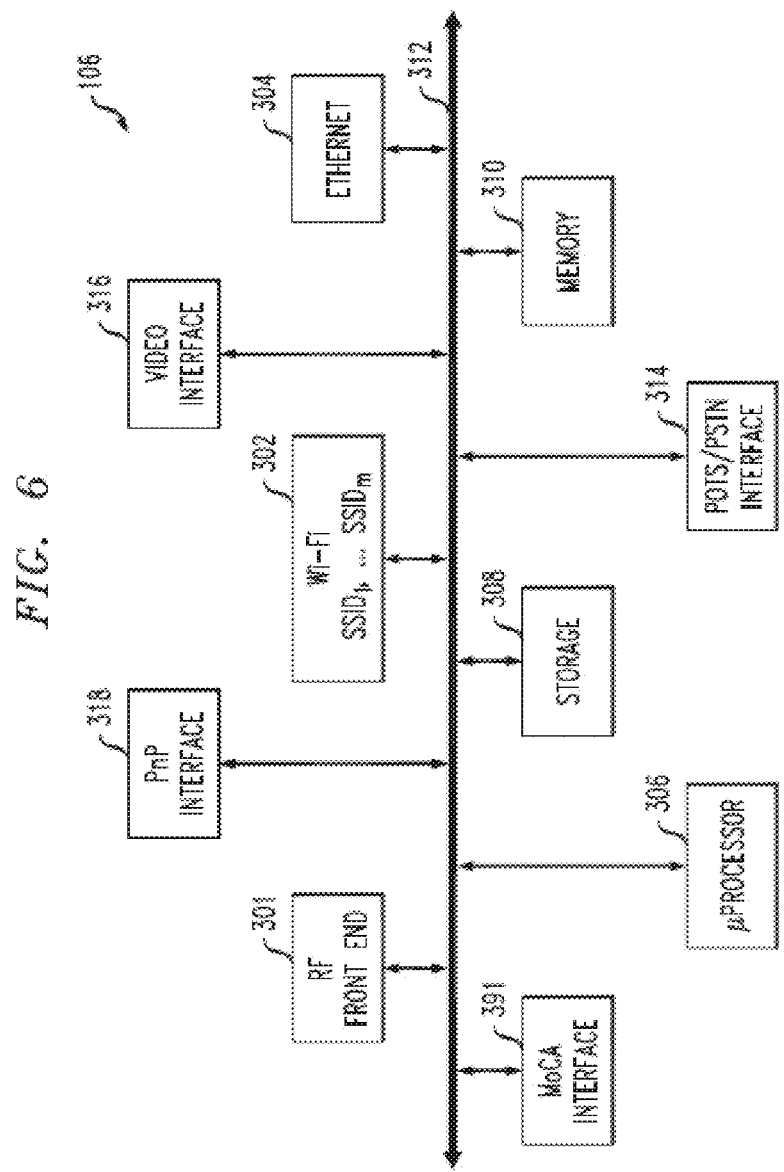
FIG. 6 is a functional block diagram of an exemplary centralized CPE unit, useful within the system of FIG. 1.

Reference should now be had to FIG. 5, which presents a block diagram of a premises network interfacing with a head-end of an MSO or the like, providing Internet access, traditional cable television (QAM) and/or IPTV. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like.

CPE 106 includes an advanced wireless gateway which connects to a head-end 150 or other hub of a network, such as a video content network of an MSO or the like. The head-end is coupled also to an internet (e.g., the Internet) 208 which is located external to the head-end 150, such as via an Internet (IP) backbone or gateway (not shown).

The head-end is, in the illustrated embodiment, coupled to multiple households or other premises, including the exemplary illustrated household 240. In particular, the head-end (for example, a cable modem termination system 156 thereof) is coupled via the aforementioned HFC network and local coaxial cable or fiber drop to the premises, including the CPE 106. The exemplary CPE 106 is in signal communication with any number of different devices including, for example, a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, an IPTV streaming device 230 (e.g., Roku, or the like) and/or a game console 292; for example, over a Multimedia over Coax Alliance (MoCA) interface, Ethernet, or other wired or wireless communication connection. Game console 292 is one example of an IPTV streaming device that could be used to watch IPTV in accordance with aspects of the invention. An IPTV streaming device 230 on which one or more embodiments are to be practiced can be connected to the Internet in many ways; an HFC network providing high-speed IP data in addition to traditional video content is merely one non-limiting exemplary embodiment. IPTV streaming device 230, like game console 292, could be connected to CPE 106 by, for example, Ethernet, Wi-Fi, or MoCA (e.g. via a MoCA-to-Ethernet bridge). All types of IPTV streaming devices or game consoles may not necessarily be capable of connection via all of Ethernet, Wi-Fi, and MoCA. Moreover, an IPTV streaming device 230 may, in one or more embodiments, be connected directly with the television 234, either via a wired or wireless connection (not explicitly shown, but implied). Some embodiments employ a Microsoft Xbox console as game console 292. Some embodiments are used only with traditional cable television services or other traditional content delivery services (e.g., fiber optic). Some embodiments that are directed to IPTV involve consumption of IPTV by devices other than, or in addition to, gaming consoles.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head-end over the interposed coax (and/or other, e.g., fiber) bearer medium. The signals include e.g., IPTV or other Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240. Again, the depicted example is non-limiting; some embodiments are directed only to traditional video delivery (non-IPTV); some embodiments are directed only to IPTV; and some embodiments are directed to both.

Any number of different data flows may occur within the network depicted in FIG. 5. For example, the CPE 106 may exchange digital telephone signals from the head-end which are further exchanged with the telephone unit 222, the Wi-Fi phone 224, or one or more roaming devices 290. The digital telephone signals may be IP-based, such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head-end 150 which is further exchanged with the Wi-Fi laptop 226, the PC 232, one or more roaming devices 290, the gaming console 292, or other device. CPE 106 may also receive digital programming that is forwarded to the DVR 228 or to the television 234. Programming requests and other control information may be received by the CPE 106 and forwarded to the head-end as well for appropriate handling.

FIG. 6 is a block diagram illustrating at least a portion of an exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled with a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive/independent disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, simple "cable box," and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304, MoCA interface 391, or plug-and-play (PnP) interface 318.

Additionally, the RF front end 301 modulates, encrypts/multiplexes as required, and transmits digital information for receipt by upstream entities such as the CMTS or a network server. This includes upstream commands from Xbox or other game console 292. In one or more embodiments, the Xbox or other game console does not communicate directly with the RF Front End 301; rather, it communicates with the RF Front End 301 over Ethernet 304 or Wi-Fi 302. In one or more embodiments that include an Xbox or other game console 292, upstream commands from the Xbox or other game console 292 are sent to the RF Front End over Ethernet 304 or Wi-Fi 302 and then upstream into the network, from the RF Front End 301, via DOCSIS or the like. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head-end 150, or another remote network agent) to support appropriate IP services.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and/or provision the CPE 106 from the cable head-end 150 or other remote network node via the cable modem (DOCSIS) interface. This control allows a remote user to configure and monitor the CPE 106 and home network.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

In addition to traditional "broadcast" content (e.g., video programming), the systems of FIGS. 1-6 may also be configured to deliver Internet data services (including IPTV) using the Internet protocol (IP), although other protocols and transport mechanisms of the type well known in the digital communication art may be substituted. The IP packets are typically transmitted on RF channels that are different than the RF channels used for the broadcast traditional video and audio programming, although this is not a requirement. The CPE 106 are each configured to monitor the particular assigned RF channel (such as via a port or socket ID/address, or other such mechanism) for IP packets intended for the subscriber premises/address that they serve. Again, it bears repeating that one or more embodiments are applicable to traditional cable television using QAMs, to other kinds of video content networks (e.g., fiber optic) and/or to internet protocol television (IPTV) delivered over any kind of IP network to any kind of IP device (a gaming console is one non-limiting example of a device that facilitates viewing IPTV)—wherever both broadcast content and video on demand (VOD) are available.

As previously stated, a set-top device (e.g., STB) periodically reports its status to the head-end. Alternatively, servers in the head-end, or at another location in the communication network, can periodically poll a particular set-top device to obtain its status. In either case, if this set-top device status is not received in the head-end when expected (e.g., within a prescribed timeout period), servers in the head-end may determine that the set-top device is unresponsive. On occasion, a set-top device may become unresponsive or inaccessible from the head-end via the communication network otherwise established between the head-end and the set-top device; the set-top device may still be functioning, but may not be communicating its status to the head-end. Conventionally, when the set-top device is determined to be inaccessible from the head-end, the set-top device would require a disruptive re-boot and/or in-home service call, which is costly, in order to diagnosis and/or recover from the communication issue.

Principles of the present invention provide a mechanism for the discovery, diagnosis and repair of a set-top device that is unresponsive or inaccessible by the head-end via the communication channel otherwise established between the head-end and the set-top device. More particularly, one or more embodiments provide a standalone search and rescue (SAR) application or module that can be delivered to and executed on a set-top device (e.g., cable STB) in a connected home network. In one or more embodiments, the SAR application is deployed to a distressed set-top device, from which diagnosis and repairs can be made. Here, the term "distressed" refers broadly to a set-top device that has limited or no connectivity with the head-end, but may otherwise be functional. Once deployed, the SAR application/module, in one or more embodiments, is configured to re-establish communications between the unresponsive set-top device and the head-end. Furthermore, re-establishment of communications between the set-top device and the head-end, according to an aspect of the invention, is performed without a need for rebooting the set-top device.

The SAR application/module may be configured, in one or more embodiments, to interrogate the connected network to identify other, potentially distressed set-top devices (e.g., in a discovery mode of operation). It is to be appreciated that the local home network, through which multiple set-top devices are connected, may comprise a wireless network (e.g., 802.11 wireless local area network (WLAN), Wi-Fi, etc.), a wired network (e.g., Ethernet, fiber optic, etc.), or a combination of wired and wireless networks, as will become apparent to those skilled in the art.

When discovered, the SAR application/module provides a link, or other connection mechanism, to each of at least a subset of the connected devices in the local home network in order to allow for the gathering of set-top device information (e.g., status, diagnostics, etc.) that could otherwise not be obtained directly from the discovered set-top device by the head-end. The SAR application may then, in one or more embodiments, re-establish communications between the head-end and the inaccessible set-top device. Further, the SAR application will, in one or more embodiments, push diagnostic information from a distressed set-top device (i.e., one with limited or no connectivity) to another connected set-top device or device in the home network that is responsive, where the diagnostic information can be readily retrieved by the head-end. In this manner, aspects of the invention can beneficially reduce the need for a disruptive reboot of the device or an in-home service call.

Typically, port 80 access on a set-top device is required for retrieving log files and other diagnostics information. On a web server or Hypertext Transfer Protocol (HTP) daemon, port 80 is the port that the server "listens to" or expects to receive from a Web client, assuming that the default port number was taken when the server was initially configured. A port can be specified in a range from 0 to 65536, for example, on a National Center for Supercomputing Applications (NCSA) server. However, the server administrator configures the server so that only one port number can be recognized. By default, the port number for a web server is 80. If the set-top device is no longer responding on port 80, either due to firewall issues or web server or other communication errors, there is essentially no way to determine the source of the communication error from the head-end.

In one or more embodiments, the SAR application determines that the local set-top device is unresponsive by attempting to connect to a local web server (e.g., port 80). If a connection cannot be established, the local set-top device is deemed to be unresponsive. Alternatively, the SAR application can interrogate the operating system (e.g., OpenCable Application Platform (OCAP) or the like) running on the local set-top device to determine whether or not the set-top device is configured for two-way communications mode. Methods for determining two-way communications status include, for example, obtaining Advanced DOCSIS (Data Over Cable Service Interface Specification) Set-top Gateway (ADSG) mode, determining the presence (or absence) of an RF IP address, and/or by polling remote head-end servers (e.g., Caller ID or switched digital video (SDV) servers).

An SAR application, according to one or more embodiments, may be downloaded to a set-top device using, for example, a Software Incremental Loader (SILo) program integrated in OCAP (OpenCable Application Platform) Digital Navigator (ODN) and Mystro Back Office (MBO) user interface (UI) products. SILo can be used to deploy applications (e.g., bundles/parcels) to a set-top device without requiring the set-top device to be rebooted. Other means for deploying the SAR application to the set-top device (i.e., other than SILo) include, but are not limited to, signaling via OCAP delivery mechanisms (e.g., extended Application Interface Table (XAIT)), direct delivery to set-top device via HTTP Push (e.g., via head-end or by proxy), delivery to set-top device via an additional protocol(s) (e.g., FTP, TFTP, or the like), Internet, reading from a digital storage media command and control (DSM-CC) object carousel, and loading from MPEG data packets. In one or more embodiments, the SAR application is implemented as a bundle application configured to be deployed via an MBO UI or ODN bundle management web page.

Generally, a set-top device is unaware that it is unresponsive, and therefore such determination is made, in one or more embodiments, through means external to the set-top device itself (e.g., from the head-end, detecting a loss of communications with the set-top device through the RF communication network). When a set-top device is determined to be unresponsive, either by the set-top device itself or through external means, the set-top device, in one or more embodiments, automatically loads the SAR application. Alternatively, head-end servers can make the SAR application available for loading and/or signal set-top devices to load the SAR application (e.g., using SILo signaling, via the DSM-CC system, which may be different than the RF network protocol). In this latter approach, head-end servers identify responsive set-top devices that are potentially locally connected with the unresponsive set-top device (i.e., connected on the same home/local network). This can be done, for example, via look-up on the user's account, among other methodologies.

Once identified, the head-end server preferably indicates, through non-two-way communications, such as, for example, DSM-CC messaging or the like, to all of the connected devices, that the SAR application is to be loaded. Further, the SAR application can be manually pushed to one or more identified set-top devices. When the head-end is unsuccessful in deploying the SAR application on an unresponsive set-top device, the SAR application can be pushed to the unresponsive set-top device through a responsive (i.e., healthy) set-top device, connected with the unresponsive set-top device via the same local network, running the SAR application. Other mechanisms for initiating the loading of the SAR application are similarly contemplated, as will become apparent to those skilled in the art given the teachings herein.

Upon receiving an indication to load the SAR application, each of at least a subset of set-top devices on the home/local network will begin downloading and execution of the SAR application. It is to be appreciated that in some circumstances, it may be possible to load the SAR application only on the affected (i.e., unresponsive) set-top device. If this does not re-establish communications with the head-end, however, it is then necessary to load the SAR application on at least one responsive networked set-top device (e.g., connected to the unresponsive set-top device via MoCA or an alternative network) that is configured, via the SAR application, to attempt to re-establish communications with the unresponsive set-top device. In one or more embodiments, once executing on any connected set-top device, the SAR application will identify all connected set-top devices on the home network and provide access to the identified devices. In this manner, a customer service representative (CSR) or other user is provided the ability to communicate with the unresponsive set-top device through the local home network.

Figure 7:
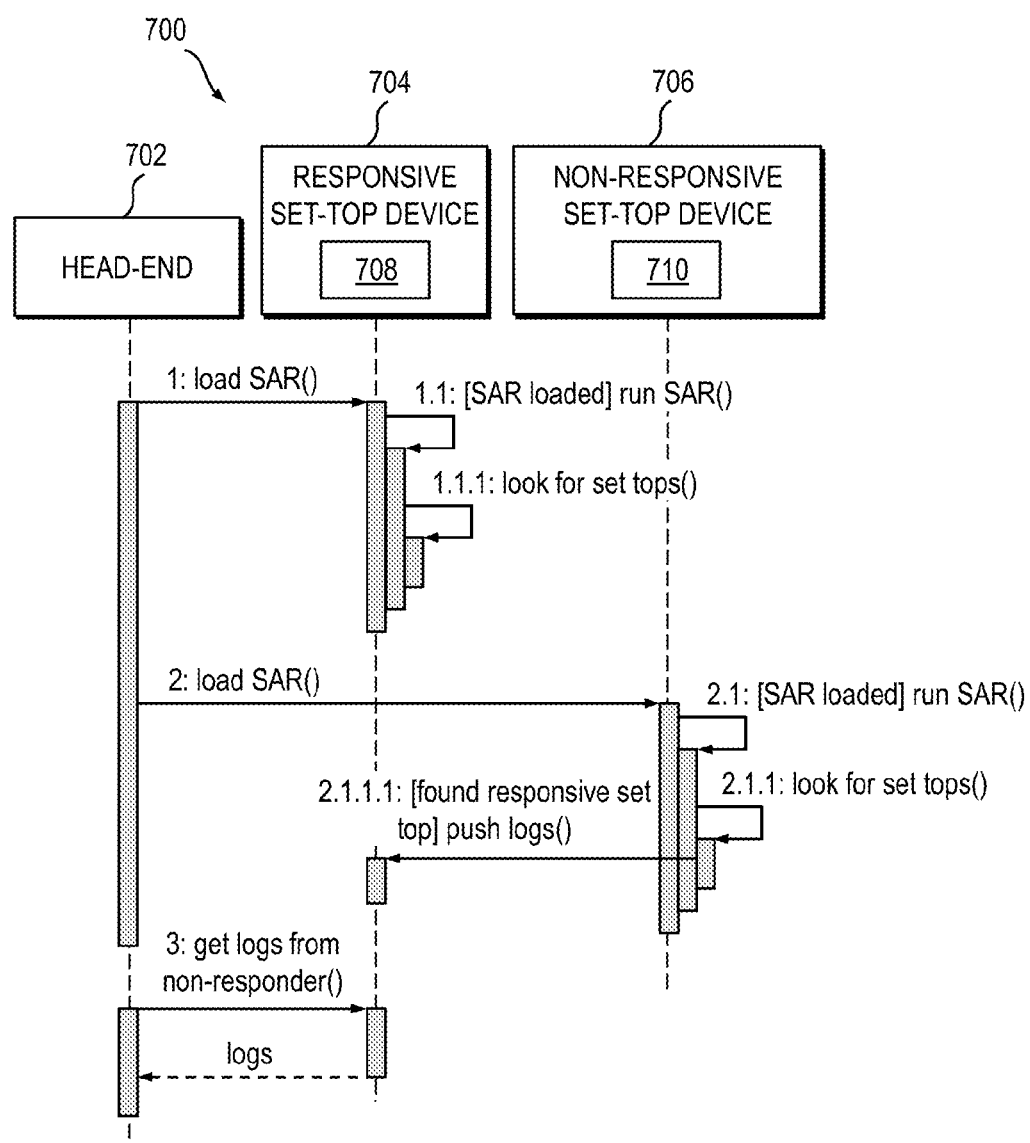
FIG. 7 is a diagram conceptually depicting at least a portion of a first exemplary search and rescue (SAR) application deployment, according to an embodiment of the invention.

FIG. 7 is a diagram conceptually depicting at least a portion of a first exemplary SAR application deployment 700, according to an embodiment of the invention. In this scenario, all set-top devices connected on a local home network (e.g., MoCA network, Ethernet, Wi-Fi, etc.) can acquire and load the SAR application. The set-top devices, collectively, can then determine whether or not they are responding.

With reference to FIG. 7, a head-end 702 is configured to make the SAR application available for download by set-top devices connected via a home network. The head-end 702 then signals one or more of the networked set-top devices to download the SAR application. As previously stated, signaling may be made, for example, through DSM-CC messaging, or via alternative means. In this illustration, a responsive (i.e., healthy) set-top device 704 downloads the SAR application (1: load SAR( )). Once loaded, the SAR application is run on the responsive set-top device 704 (1.1: [SAR loaded] run SAR( )), causing the set-top device 704 to search for other connected set-top devices on the home network (1.1.1: look for set tops( )).

Similarly, in the case of a non-responsive (i.e., distressed) set-top device 706, the non-responsive set-top device 706 downloads the SAR application (2: load SAR( )), either concurrently or at a different time than the SAR application is made available to the responsive set-top device(s) 704. Once loaded, the SAR application is run on the non-responsive set-top device 706 (2.1: [SAR loaded] run SAR( )), causing the set-top device 706 to search for other connected set-top devices on the home network (2.1.1: look for set tops( )). When the non-responsive set-top device 706 locates a responsive set-top device 704 on the home network, the non-responsive set-top device 706 pushes its log files (i.e., logs) and/or other diagnostics information to the responsive set-top device 704 (2.1.1.1: [found healthy set top] push logs( )). The head-end 702 then retrieves the log files and other diagnostics information relating to the non-responsive set-top device 706 from the responsive set-top device 704 (3: get logs from non responder( )).

As shown in FIG. 7, the responsive set-top device 704 includes a controller 708, which is configured, in one or more embodiments, to implement at least a portion of the SAR application executing on the responsive set-top device. The responsive set-top device 704 may include other components (not explicitly shown, but implied) used to store and/or execute the SAR application (e.g., memory, etc.). Likewise, the non-responsive set-top device 706 includes a controller 710, which is configured, in one or more embodiments, to implement at least a portion of the SAR application executing on the non-responsive set-top device. The non-responsive set-top device 706 may include other components (not explicitly shown, but implied) used to store and/or execute the SAR application (e.g., memory, etc.).

Figure 8:
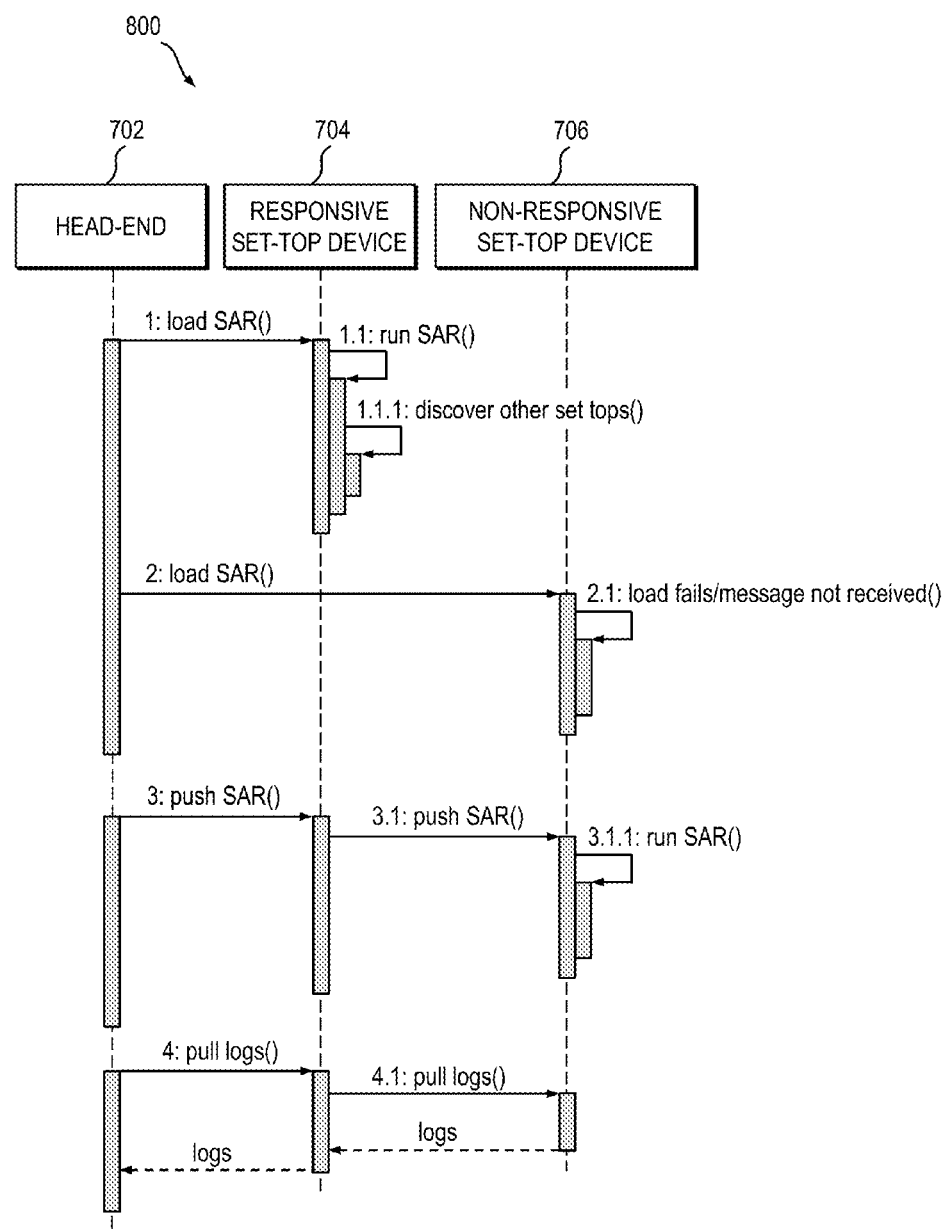
FIG. 8 is a diagram conceptually depicting at least a portion of a second exemplary SAR application deployment, according to an embodiment of the invention.

FIG. 8 is a diagram conceptually depicting at least a portion of a second exemplary SAR application deployment 800, according to an embodiment of the invention. In this scenario, only responsive set-top devices connected on a local home network (e.g., MoCA network, Ethernet, Wi-Fi, etc.) acquire and load the SAR application; set-top devices that are non-responsive fail to download the SAR application.

Specifically, with reference to FIG. 8, the SAR application is made available for download from the head-end 702, and one or more set-top devices connected on the local home network are requested to load the SAR application. The responsive set-top device 704, upon receipt of the request to load the SAR application (1: load SAR( )), downloads the SAR application. The responsive set-top device 704 then runs the SAR application (1.1: run SAR( )) which then initiates a discovery operation, whereby the set-top device 704 searches for other connected set-top devices on the home network (1.1.1: discover other set tops( )). The non-responsive set-top device 706, because of the loss of communication with the head-end 702, will not receive the request message to load the SAR application (2: load SAR( )), and will thus fail to load the SAR application (2.1: load fails/message not received( )).

In one or more embodiments, if the SAR application was successfully deployed to the non-responsive set-top device, a web page becomes accessible to the operator and/or a registration message is sent to the head-end. An operator would monitor for the occurrence of either of these events in order to determine whether or not manual deployment of the SAR application is necessary. This process can, in one or more embodiments, be automated such that a server in the head-end can escalate deployment based, for example, on prescribed timeout parameters. For instance, in one or more embodiments, the server in the head-end 702 can wait a prescribed amount of time (e.g., five minutes) for a response. If no response is received from the non-responsive set-top device 706 within the prescribed timeout period, the SAR application is deployed to a responsive networked set-top device 704. Once deployed to the networked set-top device 704, an attempt is made to deploy the SAR application to the non-responsive set-top device 706 via the networked device.

The head-end 702, aware that the non-responsive set-top device 706 failed to receive the request to load the SAR application, will manually push the SAR application to the non-responsive set-top device 706 through (i.e., proxied by) the responsive set-top device 704 (3: push SAR( ); 3.1 push SAR( )) connected on the same local home network. Once loaded, the SAR application is executed on the non-responsive set-top device 706 (3.1.1: run SAR( )), thereby causing logs and/or other diagnostic information to be collected through the responsive set-top device 704 (4: pull logs( ); 4.1 pull logs( )), and the logs and/or other diagnostic information are then transmitted back to the head-end 702 (logs) through the responsive set-top device 704 acting as a proxy.

Figure 9:
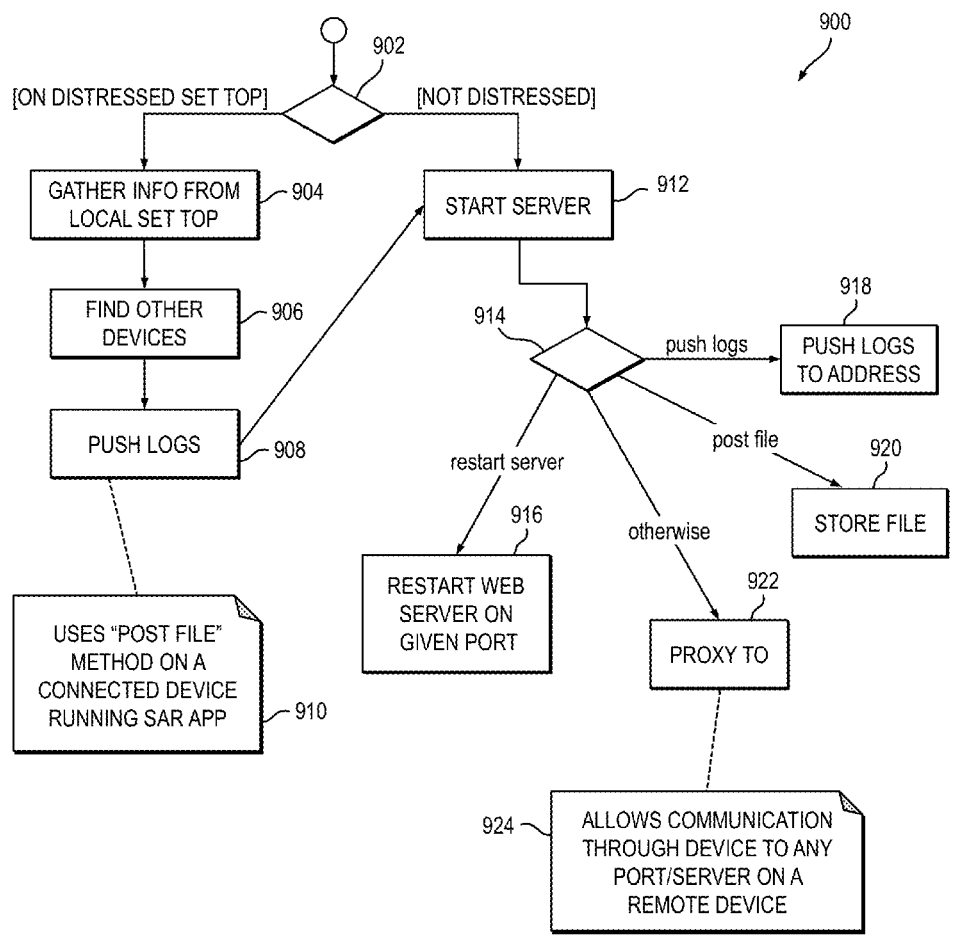
FIG. 9 is a flow diagram depicting at least a portion of an exemplary methodology performed by an SAR application deployed on a non-responsive set-top device, according to an embodiment of the invention.

With reference to FIG. 9, a flow diagram depicts at least a portion of an exemplary method 900 performed by an SAR application, according to an embodiment of the invention. The method 900 begins at step 902 by making a determination as to whether the SAR is being run on a non-responsive (i.e., distressed) set-top device or a responsive (i.e., healthy) set-top device. When deployed to a non-responsive set-top device, the SAR application collects information from the local non-responsive set-top device (step 904) and scans the home network for other connected set-top devices in a discovery mode of operation (step 906). If one or more set-top devices are found that are also running the SAR application, the SAR application running on the non-responsive set-top device will transfer its log files and/or other diagnostic information to the other connected set-top device(s) on the home network (step 908).

To transfer the log files from the non-responsive set-top device to one or more other connected set-top devices, the non-responsive set-top device may use a "POST file" method 910 on a connected set-top device running the SAR application, although alternative mechanisms for transferring log files are similarly contemplated. A POST is one of many well-known request methods supported by the HTTP protocol (e.g., RFC 1945—Hypertext Transfer Protocol—HTTP/1.0 Specification, the contents of which are hereby incorporated by reference herein in its entirety for all purposes) and used by the web; it is a protocol element that allows for the transfer of large amounts of data from the client to the server via HTTP. The POST request method is designed to request that a web server accept data enclosed in the body of a request message for storage; it is often used when uploading or transferring files.

The SAR application, running on a responsive set-top device on the home network, attempts to establish communication with the non-responsive set-top device. The SAR application does this, in one or more embodiments, by attempting to restart the ODN web server (step 912). In one or more embodiments, once the SAR application is deployed to a set-top device, it creates a web server on a prescribed port, such as, for example port 8094. This allows a browser to communicate with the SAR application. In one or more embodiments, upon connection, the browser will display a web page generated by the SAR application which provides a user with one or more options for proceeding. It is to be appreciated that port 8094 (or any port other than port 80) is preferably chosen to circumvent any issues with the default port, such as, for example, port blocking and/or the port being kept open by a misbehaving application.

For example, the SAR application running on the responsive set-top device may present (step 914) multiple functions (e.g., via its web page interface), including an ability to restart the web server on a prescribed port 916 (restart server), an ability to push log files and/or other diagnostic information to a prescribed address 918 (push logs), an ability to store the log files and/or other diagnostic information 920 (post file), and an ability to operate as a proxy for another set-top device 922 (otherwise), which allows communication through the responsive set-top device to a prescribed port and/or server on a remote device (924).

Figure 10A:
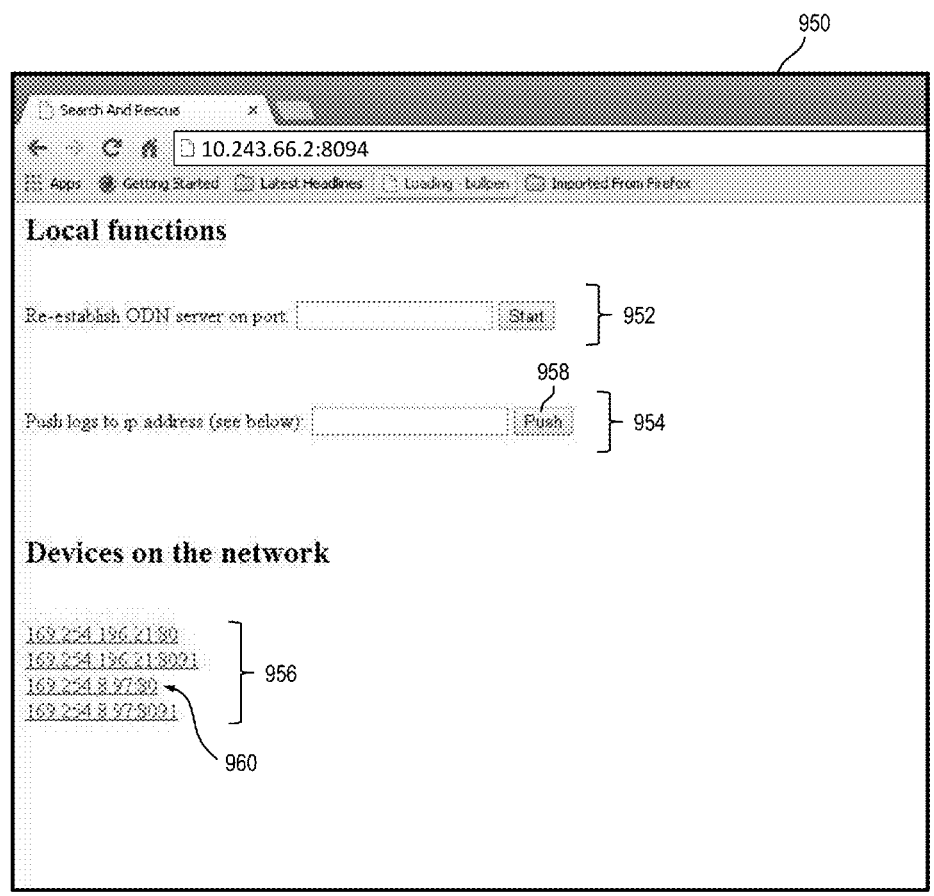
FIGS. 10A through 10C conceptually depict at least portions of exemplary web server pages generated by an SAR application, according to an embodiment of the invention.

By way of example only and without limitation, at least a portion of an illustrative web page 950 generated by the SAR application is shown in FIG. 10A, according to an embodiment of the invention. With reference now to FIG. 10A, the SAR application web page 950 provides an interface through which a user may control one or more parameters affecting a functionality of the SAR application. For example, the web page 950 may include a first area 952 for a user to designate a port on which to re-establish the ODN server, and a second area 954 for the user to designate an IP address to which to push log files from the non-responsive set-top device on which the SAR is running. The web page 950 may also display a list 956 of connected devices found on the home network, which may be indicated on the web page by their respective IP addresses, with corresponding links to each of the devices.

The SAR application will start a new instance of the ODN web server on the port specified. Valid port numbers, in one or more embodiments, may include integer values from 0 to 65535, although aspects of the invention are limited by any particular port values. If the SAR application is unable to start the ODN web server on the specified port, an error will be shown, and an alternate port may be selected, as necessary. The SAR application will push ODN RAM and disk logs to another SAR application running on another device. This may be one of the listed IP addresses 956, or an IP address lying over the RF network; that is, the data can be delivered via any routable interface to a reachable address, whether it be on the MoCA network or the RF network. The SAR application will push these files to the designated IP address when the "Push" button 958 has been selected (i.e., clicked).

In one or more embodiments, every time the SAR application web page is loaded on the browser, the SAR application will scan the network for accessible set-top devices. The SAR application then generates a new list of links 960 to the discovered devices. In some embodiments, two links are provided; a first link being a default link to the ODN web page on the connected device, and a second link being a default link to an application loader (ALoader) web page on the connected device.

Selecting a link 960, from the list of IP addresses 956 provided, will cause the SAR application to connect to the remote device and retrieve the page at a selected location. The page is processed, by the SAR application, so that all links are routed correctly through the SAR application. The page is then provided back to the browser, displaying the SAR application.

Figure 10B:
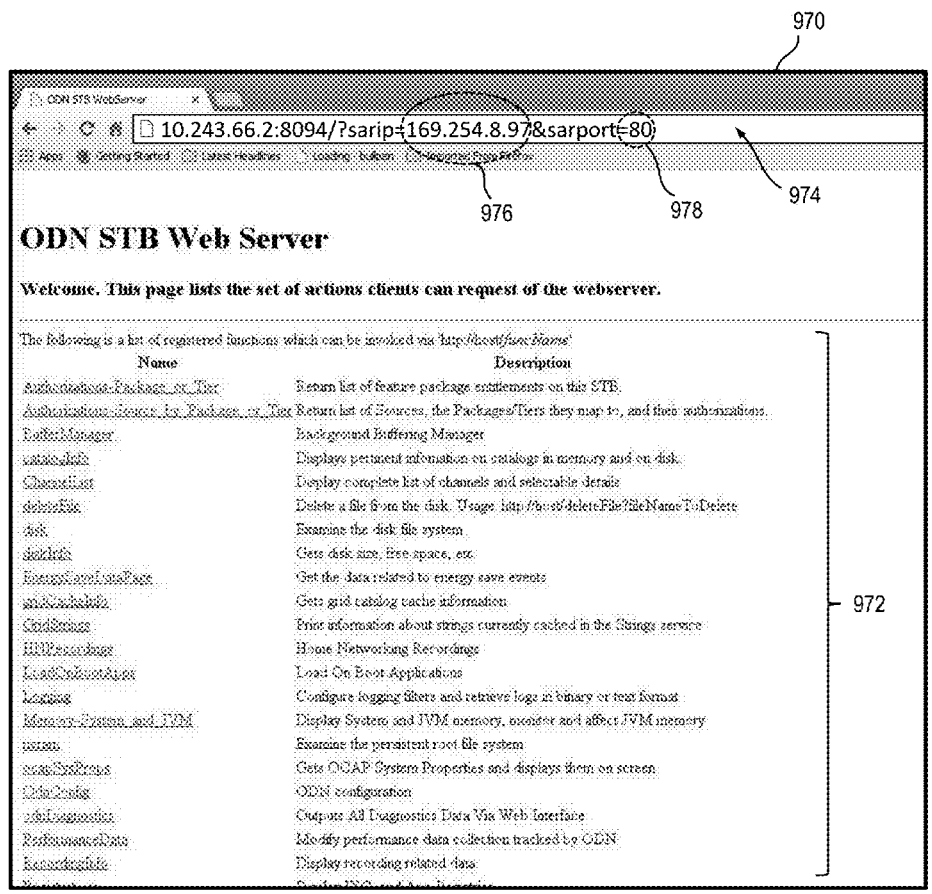

FIG. 10B conceptually depicts at least a portion of an illustrative web page 970 generated by the SAR application running on a remote set-top device, according to an embodiment of the invention. It is to be understood that aspects of the invention are limited to any particular web page design or functionality. Selecting a link (e.g., 960 in FIG. 10A) from the provided page (e.g., web page 950) will inform the SAR application to retrieve and display the page from the set-top device. This process is referred to herein as proxying. With reference to FIG. 10B, the web page 970 includes a portion 972 which displays a list of actions and corresponding descriptions that clients may request from the web server.

The web page 970 also includes a URL portion 974 which displays an address/location of the web page along with parameters which indicate which device the SAR application should proxy to. In the example shown in FIG. 10B, the URL portion 974 includes a first parameter, sarip, containing an address on the home network corresponding to the set-top device with which to communicate; in this scenario, the set-top device at address 169.254.8.97. The URL portion 974 further includes a second parameter, sarport, containing a port number on which the SAR application is to communicate; port 80 in this scenario. Modifying one or both of these parameters allows the SAR application to communicate with other SAR application instances on set-top devices (e.g., using port 8094). It may also be used to verify an ability to reach ODN web server instances that have been started at alternative ports. Through this proxy, log files and/or other information can be retrieved and the remote control can be operated. Diagnostic pages can also be displayed and navigated, in one or more embodiments.

Figure 10C:
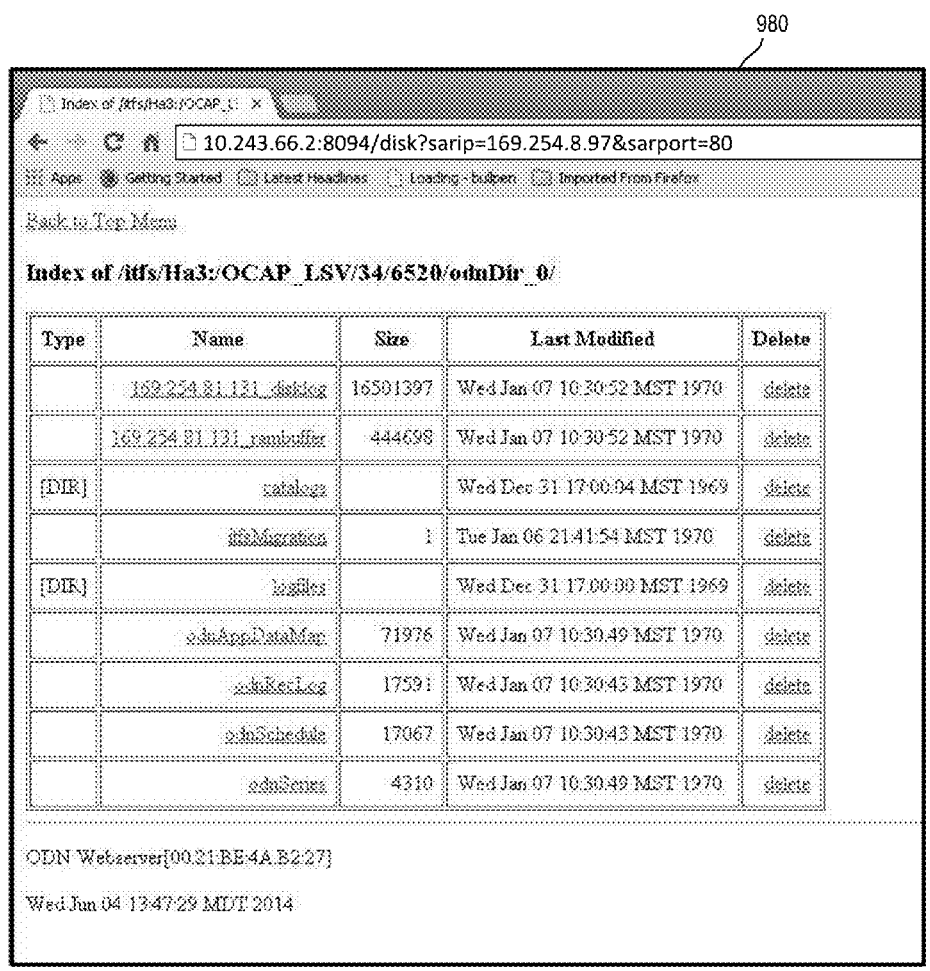

When loaded on a non-responsive set-top device (e.g., whose ODN web page is not accessible), the SAR application will, in one or more embodiments, attempt to push its log files to another, responsive, connected set-top device on the home network that is also running the SAR application. The SAR application will also start its web server on a prescribed port (e.g., port 8094). Results of push attempts will be displayed on the SAR application web page, according to one or more embodiments. If successful, the set-top device that receives the log files will list the files in its disk web page 980, an example of which is shown in FIG. 10C, according to one or more embodiments. With reference to FIG. 10C, exemplary files "169.254.81.131_disklog" and "169.254.81.131_rambuffer" can either be retrieved, by selecting the filename link, or deleted, by selecting the delete link, for the corresponding file. The IP address of the non-responsive set-top device is used, in one or more embodiments, as a prefix to each binary log file.

Figure 11:
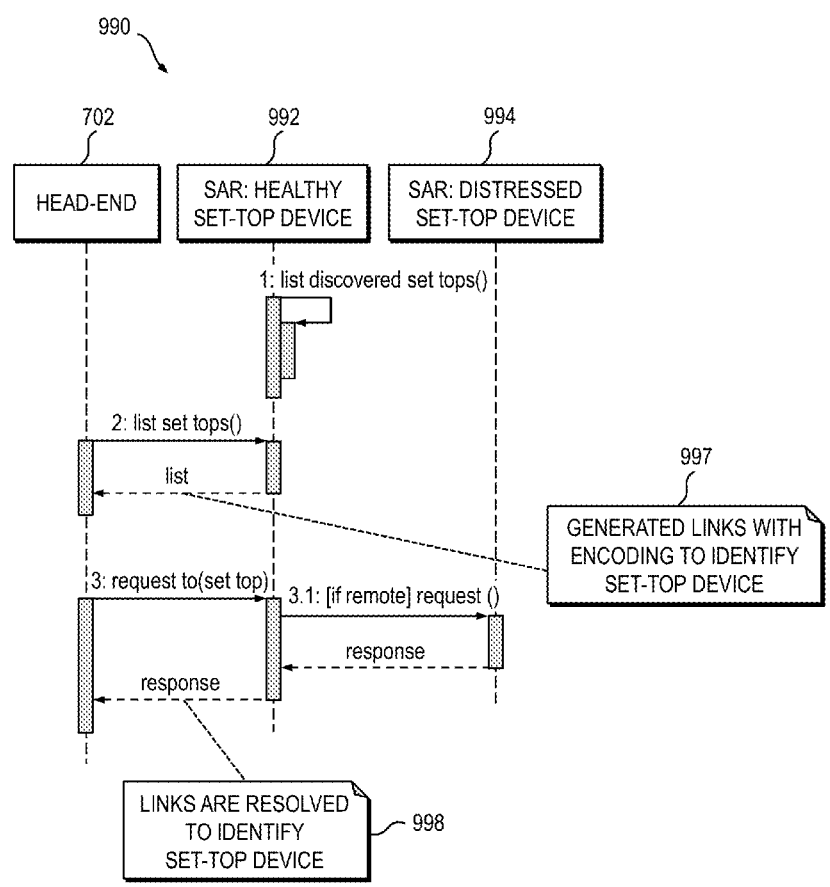
FIG. 11 is a diagram conceptually depicting at least a portion of an exemplary proxy service methodology performed by an SAR application, according to an embodiment of the invention.

FIG. 11 is a diagram conceptually depicting at least a portion of an exemplary proxy service method 990 performed by an SAR application, according to an embodiment of the invention. In this illustrative scenario, it is assumed that the SAR application is running on a responsive (i.e., healthy) set-top device 992. With the proxy service method 900, the SAR application running on the responsive set-top device 992 generates a set of links, such as during a discovery phase, for each of at least a subset of connected set-top devices on the home network to enable connection to a non-responsive (i.e., distressed) set-top device 994 (1: list discovered set tops( )). A CSR, via the head-end 702, makes a request to the responsive set-top device 992 to display the list of discovered devices (2: list set tops( )). In reply, the responsive set-top device 992 presents a list of the discovered set-top devices on the home network to the head-end 702 (list). The list of the discovered set-top devices generated by the responsive set-top device 992 includes, in one or more embodiments, a link with corresponding encoding to identify each of at least a subset of the discovered set-top devices.

The head-end/CSR 702 selects one of the links corresponding to the non-responsive set-top device 994, which thereby sends a request to access the non-responsive set-top device (3: request to(set top)). The responsive set-top device 992 intercepts the request from the head-end 702 and makes the request to the identified non-responsive set-top device 702 on behalf of (i.e., as a proxy to) the CSR (3.1: [if remote] request( )). The non-responsive set-top device 994, in reply to the request from the responsive set-top device 992, returns information (e.g., log files, diagnostic information, etc.) to the requesting responsive set-top device 992 (response). The responsive set-top device 992 attempts to resolve any links in the response (998) so as to facilitate communications between the head-end/CSR 702 and the non-responsive set-top device 994. The resolved information is then returned to the head-end/CSR 702 (response). Once communication between the head-end 702 and the non-responsive set-top device 994 has been re-established, the CSR can interact directly with the non-responsive set-top device 994, without the need for the proxy service.

Given the discussion thus far, it will be appreciated that, in general terms, an exemplary method for performing in-field discovery, diagnosis and/or repair of a set-top device, according to an aspect of the invention, includes the step of determining whether at least a first set-top device is non-responsive to a head-end via a communication channel established between the head-end and the first set-top device. The method further includes executing an SAR module on the first set-top device when it is determined that the first set-top device is non-responsive to the head-end. The method further includes re-establishing communications between the first set-top device and the head-end by the SAR module executing on the first set-top device.

In the event that the SAR module executing on the first set-top device is unsuccessful in re-establishing communications between the first set-top device and the head-end, the method, in one or more embodiments, includes the steps of searching, by the SAR module executing on the first set-top device, for at least a second set-top device connected with the first set-top device on a local network, and executing the SAR module on the second set-top device. The method further includes collecting, by the SAR module executing on the first set-top device, information relating to an operational status of the first set-top device, and sending, by the SAR module executing on the first set-top device, the information relating to the operational status of the first set-top device to the second set-top device. In this manner, the method enables the head-end, by the SAR module executing on the second set-top device, to obtain the information relating to the operational status of the first set-top device via the second set-top device.

Given the discussion thus far, it will be appreciated that, in general terms, an exemplary apparatus for performing in-field discovery, diagnosis and/or repair of a set-top device that has become inaccessible to a head-end through a communication channel established between the head-end and said set-top device includes a memory, at least one processor coupled to the memory, and a non-transitory persistent storage medium. The non-transitory persistent storage medium contains instructions which, when loaded into the memory, configure the processor to determine whether at least a first set-top device is non-responsive to a head-end via the communication channel established between the head-end and the first set-top device, and to cause an SAR module to execute on the first set-top device when it is determined that the first set-top device is non-responsive to the head-end, the SAR module executing on the first set-top device re-establishing communications between the first set-top device and the head-end.

When the SAR module executing on the first set-top device is unsuccessful in re-establishing communications between the first set-top device and the head-end, the instructions, when loaded into the memory, configure the processor to search for at least a second set-top device connected with the first set-top device on a local network, and to cause the SAR module to execute on the second set-top device. The SAR module executing on the second set-top device is configured to collect information relating to an operational status of the first set-top device from the first set-top device, whereby the head-end obtains the information relating to the operational status of the first set-top device via the second set-top device.

System and Article of Manufacture Details

Embodiments of the invention can employ hardware aspects or a combination of hardware and software aspects. Software includes but is not limited to firmware, resident software, microcode, etc. One or more embodiments of the invention or elements thereof can be implemented in the form of an article of manufacture including a machine-readable medium that contains one or more programs which, when executed, implement such step(s); that is to say, a computer program product including a tangible computer-readable recordable storage medium (or multiple such media) with computer-usable program code configured to implement the method steps indicated, when run on one or more processors. Furthermore, one or more embodiments of the invention or elements thereof can be implemented in the form of an apparatus (e.g., server, personal computer, gaming console) including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors (e.g., on the controllers 708 and 710 of FIG. 7), or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 12:
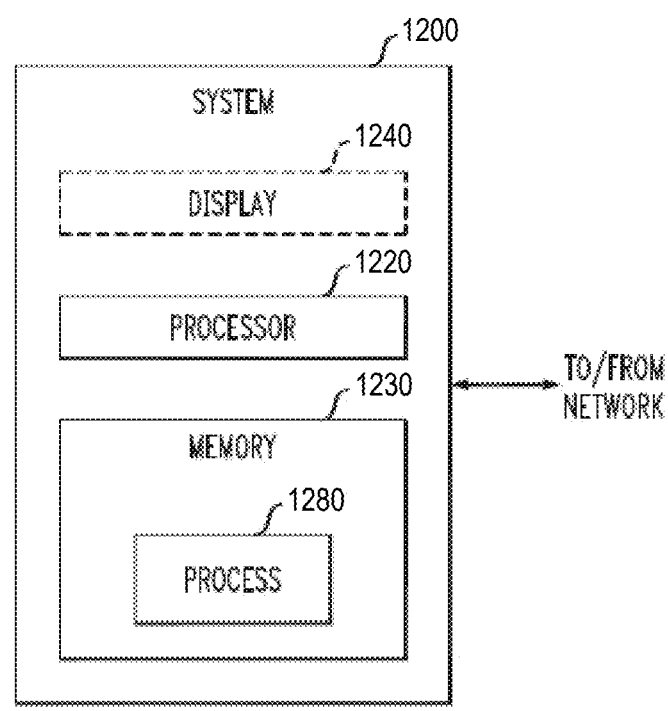
FIG. 12 is a block diagram of a computer system useful in connection with one or more aspects of the present invention.

FIG. 12 is a block diagram of a system 1200 configurable for implementing at least some aspects of the invention, and is representative, for example, of one or more of the servers or personal computers shown in the figures. As shown in FIG. 12, memory 1230 configures the processor 1220 to implement one or more methods, steps, and functions (collectively, shown as process 1280 in FIG. 12). The memory 1230 could be distributed or local and the processor 1220 could be distributed or singular. Different steps could be carried out by different processors.

The memory 1230 could be implemented as an electrical, magnetic or optical memory, or any combination of these or other types of non-transient (e.g., persistent) storage devices. It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC (application-specific integrated circuit) or FPGA (field-programmable gate array) rather than using firmware. Display 1240 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1200, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on a gaming console, a personal computer, or a virtualized or non-virtualized hardware server implementing one or more of the blocks/sub-blocks in FIGS. 1-8 (e.g., controllers 708 and 710 in FIG. 7), and the like, and that such program may be embodied on a tangible computer readable recordable storage medium. As used herein, including the claims, unless it is unambiguously apparent from the context that only server software is being referred to, a "server" includes a physical data processing system (for example, system 1200 as shown in FIG. 12) running one or more server programs. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. the SAR applications/modules executing on respective set-top devices 704 and 706 shown in FIG. 7). The method steps can then be carried out using the distinct software modules of the system, as described above, executing on one or more hardware processors (e.g., one or more hardware processors of a gaming console; a personal computer; or a server) and utilizing intermediate network links and network nodes. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising the steps of:
    determining that at least a first set-top device is non-responsive to a head-end via a communication channel established between the head-end and the first set-top device, when the first set-top device status is not received in the head-end when expected, wherein the first set-top device is capable of loading and executing an SAR module;
    executing a search and rescue (SAR) module on the first set-top device upon determining that the first set-top device is non-responsive to the head-end;
    attempting to re-establish communications between the first set-top device and the head-end by the SAR module executing on the first set-top device;
    determining that said SAR module executing on the first set-top device is unsuccessful in re-establishing communications between the first set-top device and the head-end;
    executing the same SAR module on at least a second set-top device operatively connected with the first set-top device via a local network upon determining that said SAR module executing on the first set-top device is unsuccessful in re-establishing communications between the first set-top device and the head-end, the second set-top device being responsive to the head-end;
    collecting, by the SAR module executing on the first set-top device, information relating to an operational status of the first set-top device;
    obtaining, by the same SAR module executing on the second set-top device, said information relating to the operational status of the first set-top device; and
    sending, through the second set-top device, said information relating to the operational status of the first set-top device to the head-end.

2. The method of claim 1, wherein attempting to re-establish communications between the first set-top device and the head-end comprises:
    designating a port on which to re-establish a server running on the first set-top device; and
    starting, by the SAR module executing on the first set-top device, a new instance of said server running on the first set-top device on the designated port.

3. The method of claim 1, wherein determining that the first set-top device is non-responsive to the head-end comprises at least one of:
    determining, by the SAR module executing on the first set-top device, whether a connection can be established between said first set-top device and a local web server running on the first set-top device; and
    determining, by the SAR module executing on the first set-top device, whether the first set-top device is operating in two-way communications mode.

4. The method of claim 1, wherein determining that the first set-top device is non-responsive to the head-end comprises:
    monitoring, by said head-end, status reports transmitted by the first set-top device; and
    determining that said first set-top device is non-responsive when said status reports are not received within a prescribed time period.

5. The method of claim 1, wherein obtaining said information relating to the operational status of the first set-top device comprises configuring said first set-top device to push at least one log file, including the information relating to the operational status of the first set-top device, to the second set-top device.

6. The method of claim 1, wherein obtaining said information relating to the operational status of the first set-top device comprises configuring the first set-top device to push at least one log file including said information relating to the operational status of the first set-top device to a prescribed universal resource locator address, the universal resource locator address identifying at least one set-top device operatively connected with the first set-top device on said local network.

7. The method of claim 6, wherein the universal resource locator address is specified by a user through a web server generated by the SAR module executing on the first set-top device.

8. The method of claim 1, further comprising:
    scanning, by the SAR module executing on said first set-top device, a local network on which the first set-top device is connected, for connected set-top devices; and
    generating, by the SAR module executing on the first set-top device, a list of set-top devices discovered on the local network.

9. The method of claim 1, further comprising:
    scanning, by at least a given one of the SAR modules executing on the first and second set-top devices, said local network for connected set-top devices; and
    generating, by the given one of the SAR modules, a list of set-top devices discovered on the local network.

10. The method of claim 9, further comprising generating, by the given one of the SAR modules, a plurality of links, each of the links identifying a corresponding one of the set-top devices discovered on the local network.

11. The method of claim 1, further comprising sending a request, by the head-end, to load said SAR module onto each of at least a subset of the set-top devices connected on the local network.

12. The method of claim 1, further comprising:
    generating, by the SAR module executing on the second set-top device, one or more selectable links for each of at least a subset of connected set-top devices on the local network, said one or more selectable links being configured to enable connection to the first set-top device on the local network;
    initiating a request, by the head-end, for the second set-top device to display a list of discovered set-top devices on the local network;

displaying, by the SAR application executing on the second set-top device, said list of discovered set-top devices on the local network;

selecting, by the head-end, at least a first link in said list of links, said first link being indicative of a request to access the first set-top device; and intercepting, by the SAR module executing on the second set-top device, said request to access the first set-top device, the second set-top device, acting as a proxy, making said request to access the first set-top device on behalf of the head-end.

13. The method of claim 12, further comprising, upon re-establishing communications between said head-end and the first set-top device, the SAR module executing on the second set-top device halting interception of said request to access the first set-top device, whereby requests by the head-end to access the first set-top device are routed directly to the first set-top device.

14. The method of claim 1, wherein executing the search and rescue (SAR) module on the first set-top device upon determining that the first set-top device is non-responsive to the head-end comprises pushing the SAR module by the head-end through the second set-top device to the first set-top device when the first set-top device is non-responsive to the head-end.

15. An apparatus for performing at least one of in-field discovery, diagnosis and repair of a set-top device that has become inaccessible to a head-end through a communication channel established between the head-end and said set-top device, the apparatus comprising:

a memory;

at least one processor coupled to said memory; and a non-transitory persistent storage medium that contains instructions which, when loaded into said memory, instruct said at least one processor:

to determine that at least a first set-top device is non-responsive to a head-end via a communication channel established between the head-end and the first set-top device, when the first set-top device status is not received in the head-end when expected, wherein the first set-top device is capable of loading and executing an SAR module;

to cause a search and rescue (SAR) module to execute on the first set-top device upon determining that the first set-top device is non-responsive to the head-end, said SAR module executing on the first set-top device for the purpose of re-establishing communications between the first set-top device and the head-end;

to determine that said SAR module executing on the first set-top device is unsuccessful in re-establishing communications between the first set-top device and the head-end;

to search for at least a second set-top device, connected with the first set-top device on a local network and responsive to the head-end, upon determining that said SAR module executing on the first set-top device is unsuccessful in re-establishing communications between the first set-top device and the head-end; and to cause the same SAR module to execute on the second set-top device, said SAR module executing on the second set-top device obtaining information regarding an operational status of the first set-top device from the first set-top device, whereby the head-end obtains said information relating to the operational status of the first set-top device via the second set-top device.

16. The apparatus of claim 15, wherein said instructions, when loaded into said memory, further instruct said at least one processor to instruct said first set-top device to push at least one log file, including the information regarding the operational status of the first set-top device, to the second set-top device.

17. The apparatus of claim 15, wherein said instructions, when loaded into said memory, further instruct said at least one processor to instruct said first set-top device to push at least one log file, including the information regarding the operational status of the first set-top device, to a prescribed universal resource locator address, the universal resource locator address identifying at least one set-top device operatively connected with the first set-top device on said local network.

18. The apparatus of claim 15, wherein said instructions, when loaded into said memory, further instruct said at least one processor to designate a port on which to re-establish a server running on the first set-top device, the SAR module executing on the first set-top device re-establishing communications between the first set-top device and the head-end by starting a new instance of said server running on the first set-top device on the designated port.

19. The apparatus of claim 15, wherein said instructions, when loaded into said memory, further instruct said at least one processor:

to monitor status reports generated by the first set-top device; and to determine that the first set-top device is non-responsive when said status reports are not received by the apparatus within a prescribed time period.

20. The apparatus of claim 15, wherein said instructions, when loaded into said memory, further instruct said at least one processor:

to scan a local network for connected set-top devices, the first set-top device being operatively coupled to the local network; and to generate a list of set-top devices discovered on the local network.

21. The apparatus of claim 15, wherein at least a portion of said apparatus is incorporated into the first set-top device.

22. The apparatus of claim 15, wherein causing the search and rescue (SAR) module to execute on the first set-top device upon determining that the first set-top device is non-responsive to the head-end further comprises pushing the SAR module by the head-end through the second set-top device to the first set-top device when the first set-top device is non-responsive to the head-end.

23. A first set-top device, comprising:

a memory;

at least one processor coupled to the memory; and a non-transitory persistent storage medium that contains instructions which, when loaded into said memory, instruct the at least one processor:

to determine that the first set-top device is non-responsive to a head-end via a communication channel established between the head-end and the first set-top device, when the first set-top device status is not received in the head-end when expected, wherein the first set-top device is capable of loading and executing an SAR module;

to execute a search and rescue (SAR) module on the first set-top device upon determining that the first set-top device is non-responsive to the head-end via the communication channel established between the head-end and the first set-top device, said SAR module executing on the first set-top device for the purpose of re-establishing communications between the first set-top device and the head-end;

to determine that said SAR module is unsuccessful at re-establishing communications between the first set-top device and the head-end;

upon determining that said SAR module is unsuccessful at re-establishing communications between the first set-top device and the head-end, to search for at least a second set-top device, connected with the first set-top device on a local network, said SAR module executing on the first set-top device providing information regarding an operational status of the first set-top device to said second set-top device, whereby the head-end obtains said information relating to the operational status of the first set-top device via the second set-top device.

24. A non-transitory computer readable medium comprising computer executable instructions which when executed by a computer cause the computer to perform the steps of:

when the first set-top device status is not received in the head-end when expected, wherein the first set-top device is capable of loading and executing an SAR module;

executing a search and rescue (SAR) module on the first set-top device upon determining that the first set-top device is non-responsive to the head-end;

attempting to re-establish communications between the first set-top device and the head-end by the SAR module executing on the first set-top device;

determining that said SAR module executing on the first set-top device is unsuccessful in re-establishing communications between the first set-top device and the head-end;

upon determining that said SAR module executing on the first set-top device is unsuccessful in re-establishing communications between the first set-top device and the head-end, executing the same SAR module on at least a second set-top device operatively connected with the first set-top device via a local network, the second set-top device being responsive to the head-end;

collecting, by the SAR module executing on the first set-top device, information relating to an operational status of the first set-top device;

obtaining, by the same SAR module executing on the second set-top device, said information relating to the operational status of the first set-top device; and sending, through the second set-top device, said information relating to the operational status of the first set-top device to the head-end.

25. The non-transitory computer readable medium of claim 24, wherein executing the search and rescue (SAR) module on the first set-top device upon determining that the first set-top device is non-responsive to the head-end comprises pushing the SAR module by the head-end through the second set-top device to the first set-top device when the first set-top device is non-responsive to the head-end.

* * * * *